United States Patent [19]
Causley et al.

[11] Patent Number: 4,818,285
[45] Date of Patent: Apr. 4, 1989

[54] INK JET PRINTER INK COMPOSITION AND PROCESS FOR PRODUCING SAME

[75] Inventors: Gary C. Causley, Aloha; Mary J. Peterson, Portland, both of Oreg.

[73] Assignee: Tektronix, Inc., Beaverton, Oreg.

[21] Appl. No.: 113,795

[22] Filed: Oct. 27, 1987

[51] Int. Cl.$^4$ ............................................. C09D 11/02
[52] U.S. Cl. ........................................ 106/22; 106/20
[58] Field of Search .................................... 106/20, 22

[56] References Cited
U.S. PATENT DOCUMENTS

| | | | |
|---|---|---|---|
| 4,388,115 | 6/1983 | Sugiyama et al. | 106/22 |
| 4,409,040 | 10/1983 | Tabayashi et al. | 106/22 |
| 4,425,162 | 1/1984 | Sugiyama et al. | 106/22 |
| 4,446,470 | 5/1984 | Sugiyama et al. | 106/22 |
| 4,512,807 | 4/1985 | Ogawa et al. | 106/22 |
| 4,613,525 | 9/1986 | Miyamoto et al. | 428/341 |

*Primary Examiner*—Amelia B. Yarbrough
*Attorney, Agent, or Firm*—John D. Winkelman; Jerome S. Marger

[57] ABSTRACT

The ink compositions of this invention comprise four aqueous component ink compositions including four different water-soluble dyes, namely, water-soluble cyan, magenta, yellow and black dyes. These component ink compositions, when used together, produce a hard copy image having a color gamut that visually more closely corresponds to the color gamut of an image displayed on the color video screen than prior art ink compositions. This specific color gamut is represented by the hereinafter described specific ranges of hue angles in a CIELAB standard chromaticity diagram for each of such component ink compositions. The nature and identity of the component ink compositions are also further described by providing the preferred ranges for each component of the wavelength of maximum absorbance (Lambda max, measured in nm) and for the spectral strength in ml/absorbance unit at that maximum point of absorbance.

20 Claims, No Drawings

INK JET PRINTER INK COMPOSITION AND PROCESS FOR PRODUCING SAME

BACKGROUND OF THE INVENTION

The present invention relates to a specifically formulated color ink composition for use in ink jet printing applications.

The market for color hard copy devices is a rapidly growing one, being driven by increasingly large numbers of color displays in use in various types of computing systems. In this regard, ink jet printing has been successfully applied to color graphics applications since ink jets are capable of making color hard copies having excellent image quality.

Color inks for use in ink jet printers are typically formulated to a fairly specific set of color and physical properties. To this end, the use generally of water-soluble dyes in conjunction with a solvent, such as water, and a water-miscible organic compound such as N-alkanolamines, have been employed. See Japanese No. 61036380 (abstract), Japanese No. 81147750 (abstract), German No. 3445225 (abstract), Japanese No. 6105766 (abstract), Japanese No. 61085886 (abstract). Other patents relating to ink jet printing produce aqueous magenta inks by dissolving two water-soluble red dyes in water. In Japanese No. 60149676 (abstract), C.I. Reactive Red 66 is one of the dyes employed. In Japanese No. 61179275 (abstract), Acid Red 92 is used in conjunction with at least one dye selected from Acid Red 35, Acid Red 37, Acid Red 249, Acid Red 254, Acid Red 289, Direct Red 9, and Direct Red 227. Regarding aqueous ink compositions using various blue (cyan) dyes, Direct 86 has been employed in Japanese No. 60092369 (abstract), Japanese No. 59051959 (abstract), Japanese No. 60199078 (abstract), and Japanese No. 60197778 (abstract). Finally, Japanese No. 59093765 (abstract) and Japanese No. 58208357 (abstract) describe the use of various black dyes in ink compositions for jet printing purposes.

There are situations in which the hard copy produced by the color ink jet printer should closely match the corresponding color image displayed on a CRT screen. One method of matching hard copy colors to video display colors is described in U.S. Pat. No. 4,670,780 to McManus et al. For a video display, McManus et al. notes that color is produced by adding light emissions from the red, green and blue phosphors, while for a hard copy device, color is produced by subtracting light via the inks used to print the image on a record medium. The result is that, typically, the video display red is not the same as the hard copy red. In FIG. 1 of the McManus et al. patent, the color gamuts of a particular video display and a particular ink and paper system are shown. In the method of McManus et al., a color transformation algorithm is provided for matching video display color the hard copy color, taking into account both the limitations of video color and of the imperfect character of the colorants in the inks used. Even with the McManus et al. method, it is still highly desirable to provide ink compositions that are specifically formulated to provide an improved visual match with a video color image as actually displayed on a CRT, particularly at lower intensity settings.

Therefore, a need exists for improved ink compositions for use in an ink jet color printer to produce a color hard copy that more satisfactorily reproduces the color image displayed on the CRT associated with that color printer.

SUMMARY OF THE INVENTION

This invention meets the foregoing need for improved ink compositions for use with an ink jet color printer. Hard copies produced by an ink jet printer employing the subject ink compositions more closely replicate the CRT color image on a color video display associated with that printer. Stated another way, when the ink compositions of this invention are used in the above-described printer, the hereinafter-defined CIE-LAB standard chromaticity diagram of the composite ink compositions of the present invention are more closely similar to the CIELAB standard chromaticity diagram of the color video display.

The CIE system (Commission International de l'Eclairage, or International Commission on Illumination) defines a color coordinate system in which all the components X, Y, and Z all have positive values. The CIE diagram is a horseshoe-shaped spectrum locus in plane Cartesian X-Y coordinate system on which points representing the chromaticities of the spectrum colors are plotted according to their wavelengths in nanometers (nm). As a convenience in obtaining two-dimensional maps of colors, it is usual to calculate chromaticity coordinates that describe the qualities of a color in addition to its luminance factor, namely, its chromaticity that correlates to some extent with its hue and chroma. The Z-axis, orthogonal to the X-Y plane, determines the luminance of the color. An irregular polygon represents the colors that can be displayed by a hard copy device, such as an ink-jet printer with cyan, magenta, and yellow inks, and a particular paper. The video display color gamut is represented by a triangle, i.e., the colors displayed by a particular three primary color system, such as the NTSC phosphor-set commonly used for color cathode-ray tubes.

The space occupied by a given uniform color has been defined by CIE. In 1950, Nickerson published a table of the Munsell renotation value function known as ANLAB space. In 1976, CIE modified the ANLAB space for easier calculation by substituting the cube-root function incorporated in L* for the Munsell value function. This modification became know as the 1976 CIE L*a*b* space, with the offical abbreviation CIE-LAB.

The ink compositions of this invention comprise four aqueous component ink compositions including four different water-soluble dyes, namely, water-soluble cyan, magenta, yellow and black dyes. These component ink compositions, when used together, produce a hard copy image having a color gamut that visually more closely corresponds to the color gamut of an image displayed on the color video screen than prior art ink compositions. This specific color gamut is represented by the hereinafter described specific ranges of hue angles in a CIELAB standard chromaticity diagram for each of such component ink compositions. The nature and identity of the component ink compositions are also further described by providing the preferred ranges for each component of the wavelength of maximum absorbance (Lambda max, measured in nm) and for the spectral strength in ml/absorbance unit at that maximum point of absorbance.

The foregoing and other objects, features and advantages of the invention will become more readily apparent from the following detailed description of a preferred embodiment.

DETAILED DESCRIPTION OF A PREFERRED EMBODIMENT

This invention relates to a set of ink compositions for use in an ink jet color printer associated with a color display device. The subject compositions comprise first, second, third, and fourth component ink compositions, each of which includes a water-soluble dye and a liquid diluent system.

The liquid diluent system in each of the component ink compositions comprises from about 30 to 100 weight % of an aqueous solvent, and from about 0 to 70 weight % of a water-soluble organic solvent, the weight % of the aqueous solvent and water-soluble organic solvent being based on the total weight of the liquid diluent system. Preferably, the aqueous solvent comprises water, in an amount of from about 75 to about 98 weight %, and more preferably from about 80 to 95 weight %. The organic solvent is preferably triethanolamine, which is employed in an amount from about 2 to 25 weight %, and preferably from about 5 to 15 weight %.

In a preferred formulation, the liquid diluent system also includes a chelating agent and a biocide. Thus, the liquid diluent system preferably includes from about 0 to 0.5 weight % of the chelating agent and from about 0 to 1.0 weight % of the biocide. The chelating agent of preference is ethylenediaminetetraacetic acid (EDTA), and the preferred biocide is Dowicil 75 manufactured by Dow Chemical. Dowicil 75 is a powdered material composed of 1-(3-chloroallyl)-3,5,7-triaza-1-azoniaadamantane chloride, sodium bicarbonate and hexamethylenetetramine hydrochloride.

The component ink compositions of this invention each include a different one of four water-soluble dyes, namely, cyan dye, magenta dye, yellow dye, and black dye. The first (cyan), second (magenta), third (yellow) component ink compositions, and particularly, the water-soluble dye components thereof, are selected so that they provide a color gamut in which the first, second, and third component ink compositions, as well as the first, second and third secondary colors formed therefrom, have specified hue angles in a CIELAB standard chromaticity diagram, as measured with reference to an Illuminant C, 2° standard observer. The fourth (black) component in the composition likewise is formulated to provide a specific hue angle. The designation Illuminant C describes the specific standard illuminant source employed, namely, a simulated overcast-sky daylight condition. Furthermore, the status of the standard observer also serves to establish a CIE standard. In this case, a 2° standard observer is employed in defining the color gamut herein.

The first component ink composition contains a water-soluble cyan dye. The preferred cyan dye compound is Direct Blue 86, such as Intrabond Liquid Turquoise GLL, manufactured by Crompton and Knowles.

The second component ink composition contains a water-soluble magenta dye. Preferably, the magenta dye comprises a plurality of individual magenta dye compounds. The preferred magenta dye compounds are Reactive Red 40 and Acid Red 52. Exemplary magenta dyes compounds include Bay Script Brilliant Red Ink 4B, manufactured by Mobay Chemical (Reactive Red 40), and Sandolan Rhodamine E-B manufactured by Sandoz Chemical (Acid Red 52).

The third component ink composition contains a water-soluble yellow dye compound, preferably Direct Yellow 107. A preferred Direct Yellow 107 compound is Direct Yellow G200, manufactured by Crompton and Knowles.

Finally, the fourth component ink composition contains a water-soluble black dye compound. A preferred black dye is SP Black Liquid, manufactured by Mobay Chemical.

As previously stated, each of the component ink compositions has been selected so that they provide a color gamut that has certain specified range of angles in a CIELAB standard chromaticity diagram. These hue angles of the component ink compositions in the CIELAB color space are measured, using the Illuminant C and 2° standard observer functions, on an Applied Color Systems Spectrasensor II, model 1400, scanning spectraphotometer. Thus, the first (cyan) component ink composition has an angle in a CIELAB standard chromaticity diagram of from about 235° up to about 265°, and preferably from about 240° up to about 260°, and more preferably from about 245° up to about 255°. The second (magenta) component ink composition has an angle in the CIELAB standard chromaticity diagram of from about 330° up to about 360°, preferably from about 335° up to about 355°, and more preferably from about 340° up to about 350°. The third (yellow) component ink composition has an angle in the CIELAB standard chromaticity diagram of from about 85° up to about 115°, and preferably from about 90° up to about 110°, and more preferably from about 95° up to about 105°.

When certain of the component ink compositions are combined, as by overprinting on a record medium, in substantially equal proportions, secondary colors are formed which themselves have certain specific hue angle ranges. Thus, a first secondary color (blue) formed from the first and second (cyan and magenta) component ink compositions has an angle in the CIELAB standard chromaticity diagram from about 290° up to about 320°, preferably from about 295° up to about 315°, and more preferably from about 300° up to about 310°. A second secondary color (green) formed from the first and third (cyan and yellow) component ink compositions has an angle in the CIELAB standard chromaticity diagram of from about 150° up to about 180°, preferably from about 155° up to about 175°, and more preferably from about 160° up to about 170°. Finally, a third secondary color (red) formed from the second and third (magenta and yellow) component ink compositions has an angle in the CIELAB standard chromaticity diagram of about 15° up to about 45°, preferably from about 20° up to about 40°, and more preferably from about 25° up to about 35°.

The nature and identity of the respective component ink compositions of this invention can be further defined in several ways. For instance, the CIELAB angles of the respective first, second, and third component ink compositions, and the CIELAB angles of the first, second, and third secondary colors, are substantially evenly spaced one from the other in the CIELAB standard chromaticity diagram.

Another way of defining the respective component ink composition of the present invention is by specifying the wavelength of maximum absorbance of the UV/visible spectrum (Lambda max.) of each respective component ink composition. The wavelength data is measured on a Perkin Elmer Lambda 3B UV/visible spectrometer. Thus, the wavelengths of maximum absorbance of the respective component ink compositions preferably are as follows: for the first (cyan) component ink composition, from about 660 to 670 nm, and more preferably from about 663 to 667 nm; for the second (magenta) component ink composition from about 554 to 564 nm, and more preferably from about 557 to 561 nm; for the third (yellow) component ink composition from about 397 to 407 nm and more preferably from about 400 to 440 nm, and for the fourth (black) component ink composition from about 572 to 582 nm, and more preferably from about 575 to 579 nm.

Another component ink composition defining property is the spectral strength of each of the compositions, measured in ml/absorbance unit at the maximum point of absorbance. More specifically, spectral strength is measured by aqueous dilution of the respective component ink compositions in a one centimeter cell, at the maximum absorbency wavelength, in the aforementioned Perkin Elmer Lambda 3B UV/visible spectraphotometer, until one absorbance unit is read on the spectraphotometer. Thus, the spectral strength, in ml/absorbance unit, of each of the respective component ink compositions is preferably as follows: for the first (cyan) component ink composition from about $1.3 \times 10^{-4}$ to about $2.1 \times 10^{-4}$, more preferably about $1.5 \times 10^{-4}$ to about $1.9 \times 10^{-4}$, and most preferably from about $1.6 \times 10^{-4}$ to about $1.8 \times 10^{-4}$; for the second (magenta) component ink composition from about $6.6 \times 10^{-4}$ to about $11.1 \times 10^{-4}$, more preferably from about $7.7 \times 10^{-4}$ to about $10.0 \times 10^{-4}$, and most preferably from about $8.3 \times 10^{-4}$ to about $9.3 \times 10^{-4}$; for the third (yellow) component ink composition from about $8.3 \times 10^{-4}$ to about $13.8 \times 10^{-4}$, more preferably from about $8.8 \times 10^{-4}$ to about $13.3 \times 10^{-4}$, and most preferably from about $9.5 \times 10^{-4}$ to about $12.5 \times 10^{-4}$; and for the fourth (black) component ink composition from about $4.3 \times 10^{-4}$ to about $7.3 \times 10^{-4}$, and more preferably from about $4.8 \times 10^{-4}$ to about $6.8 \times 10^{-4}$, and most preferably from about $5.3 \times 10^{-4}$ to about $6.3 \times 10^{-4}$.

EXAMPLE

The following example illustrates the properties of preferred ink formulations of the present invention.

Component ink compositions were formulated as follows:

Ink No. 1 (Cyan): 20.4 weight % Crompton and Knowles Intrabond liquid turquoise LL (Direct Blue 86), 2.9 weight % triethanolamine, 0.25 weight % Dowicil 75, 0.05 weight % EDTA, and 76.4 weight % deionized water.

Ink No. 2 (Magenta): 1.9 weight % Mobay Chemical Base Script Brilliant Red E4B (Reactive Red 40), 0.56 weight % Sandoz Chemical Sandolan Rhodamine E-B (Acid Red 52), 7.7 weight % triethanolamine, 0.25 weight % Dowicil 75, 0.05 weight % EDTA, and 89.54 weight % deionized water.

Ink No. 3 (Yellow): 1.55 weight % Crompton and Knowles Direct Yellow G200 (Direct Yellow 107), 11.2 weight % triethanolamine, 0.25 weight % Dowicil 75, 0.05 weight % EDTA, and 86.9 weight % deionized water.

Ink No. 4 (Black): 18.4 weight % Mobay Chemical SP Black liquid, 5.8 weight % triethanolamine, 0.25 weight % Dowicil 75, 0.05 weight % EDTA, and 75.9 weight % deionized water.

Each of the inks was printed on Tektronix coated ink jet paper, P/N 016-0743-00, using a Tektronix 4696 Color Ink-Jet Printer. The hue angles of the inks were measured using the Illuminant C and the 2° standard observer functions on an Applied Color Systems Spectrasensor II, Model 1400, scanning spectraphotometer. The results of the hue angle measurements were as follows: Ink no. 1, 250°; Ink no. 2, 345° and Ink no. 3, 100°. When combinations of the inks were mixed in substantially equal proportions by overprinting on the same area of the above-referenced paper by the above-referenced printer, the secondary colors produced the following hue angles: first secondary color (blue) 305°; second secondary color (green) 165°, and third secondary color (red) 30°. The Lambda max. values were determined to be the following: Ink No. 1, 665 nm; Ink No. 2, 559 nm; Ink No. 3, 402 nm; Ink No. 4, 577 nm. The deviation for each of the Lambda max. readings was determined to be +/−5 nm.

The spectral strength of the ink compositions was determined to be the following: Ink No. 1, $1.70 \times 10^{-4}$ $+/-0.1 \times 10^{-4}$, ml/absorbance unit at 665 nm; Ink No. 2, $8.83 \times 10^{-4} +/-0.5 \times 10^{-4}$, ml/absorbance unit at 559 nm; Ink No. 3, $11.0 \times 10^{-4} +/-1.5 \times 10^{-4}$, ml/absorbance unit at 402 nm; and Ink No. 4, $5.83 \times 10^{-4} +/-0.5 \times 10^{-4}$, ml/absorbance unit at 577 nm.

The color gamut of the hard copy image printed by the Tektronix 4696 Color Ink-Jet Printer onto the Tektronix P/N 16-0743-00 coated ink jet paper was observed to be visually similar to the image displayed on the associated video color monitor.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A set of ink compositions for use in an ink jet color printer associated with a color display device, which comprises:

a first component ink composition including a water-soluble cyan dye, and a liquid diluent system comprising from about 30 to 100 weight % of an aqueous solvent, and from about 0 to about 70 weight % of a water-soluble organic solvent, based on the total weight of said diluent system;

a second component ink composition comprising a water-soluble magenta dye, and a liquid diluent system comprising from about 30 to 100 weight % of an aqueous solvent, and from about 0 to 70 weight % of a water-soluble organic solvent, based on the total weight of said diluent system;

a third component ink composition comprising a water-soluble yellow dye, and a liquid diluent system comprising from about 30 to 100 weight % of an aqueous solvent, and from about 0 to 70 weight % of a water-soluble organic solvent, based on the total weight of said diluent system;

said first component ink composition having an angle in a CIELAB standard chromaticity diagram of from about 235° up to about 265°, said second component ink composition having an angle in the CIELAB standard chromaticity diagram of from about 330° up to about 360°, said third component ink composition having an angle in the CIELAB standard chromaticity diagram of from about 85° up to about 115°, a first secondary color formed from said first and second component ink compositions having an angle in the CIELAB standard chromaticity diagram of from about 290° up to about 320°, a second secondary color formed from said first and third component ink compositions having an angle in the CIELAB standard chromaticity diagram of from about 150° up to about 180°, and a third secondary color formed from second and third component ink compositions having an angle in the CIELAB standard chromaticity diagram of from about 15° up to about 45°, all of said CIELAB standard chromaticity diagrams being measured with reference to an illuminant C, 2° standard observer.

2. The set of ink compositions of claim 1, said set further including a fourth component ink composition comprising a water-soluble black dye, and a liquid diluent system comprising from about 30 to 100 weight % of an aqueous solvent, and from about 0 to 70 weight % of a water-soluble organic solvent, based on the total weight of said diluent system.

3. The set of ink compositions of claim 1, wherein said CIELAB angles comprise from about 245° up to about 255° for said first component ink composition, from about 335° up to about 355° for said second component ink composition, from about 90° up to about 110° for said third component ink composition, from about 295° up to about 315° for said first secondary color, from about 155° up to about 175° for said second secondary color, from about 20° up to about 40° for said third secondary color.

4. The set of ink compositions of claim 1, wherein said CIELAB angles of said respective first, second and third component ink compositions and said first, second and third secondary colors, are substantially evenly spaced one from the other in the CIELAB standard chromaticity diagram.

5. The set of ink compositions of claim 1, wherein the wavelength of maximum absorbance of said respective component ink compositions comprise from about 660 nm up to about 670 nm for said first component ink composition, from about 554 nm up to about 564 nm for said second component ink composition, and from about 397 nm up to about 407 nm for said third component ink composition.

6. The set of ink compositions of claim 2, wherein the wavelength of maximum absorbance of said respective component ink compositions comprise from about 660 nm up to about 670 nm for said first component ink composition, from about 554 nm up to about 564 nm for said second component ink composition, and from about 397 nm up to about 407 nm for said third component ink composition, and from about 572 nm up to about 582 nm for said fourth component ink composition.

7. The set of ink compositions of claim 2, wherein the spectral strength in ml/absorbance unit at the maximum point of absorbance (measured in nm) of said respective component ink compositions comprise from about $1.3 \times 10^{-4}$ to about $2.1 \times 10^{-4}$ for said first component ink composition, from about $6.6 \times 10^{-4}$ to about $11.1 \times 10^{-4}$ for said second component ink composition, from about $8.3 \times 10^{-4}$ to about $13.8 \times 10^{-4}$ for said third component ink composition, and from about $4.3 \times 10^{-4}$ to about $7.3 \times 10^{-4}$ for said fourth component ink composition.

8. The set of ink compositions of claim 1, wherein said liquid diluent comprises from about 85 to 98 weight % of water, and from about 2 to 15 weight % of triethanolamine.

9. The set of ink compositions of claim 1, wherein said cyan dye comprises Direct Blue 86 dye, said magenta dye comprises Acid Red 52 dye and Reactive Red 40 dye, respectively, and said yellow dye comprises Direct Yellow 107.

10. The set of ink compositions of claim 9, wherein said liquid diluent includes a chelating agent and a biocide.

11. A process for producing a set of ink compositions for use in an ink jet color printer associated with a color display device, which comprises:
   forming a first component ink composition comprising a water-soluble cyan dye, and a liquid diluent system comprising from about 30 to 100 weight % of an aqueous solvent, and from about 0 to 70 weight % of a water-soluble organic solvent, based on the total weight of said diluent system;
   forming a second component ink composition comprising a water-soluble magenta dye, and a liquid diluent system comprising from about 30 to 100 weight % of an aqueous solvent, and from about 0 to 70 weight % of a water-soluble organic solvent, based on the total weight of said diluent system;
   forming a third component ink composition comprising a water-soluble yellow dye, and a liquid diluent system comprising from about 30 to 100 weight % of an aqueous solvent, and from about 0 to 70 weight % of a water-soluble organic solvent, based on the total weight of said diluent system;
   selecting first, second, and third component ink compositions so that said first component ink composition has an angle in a CIELAB standard chromaticity diagram of from about 235° up to about 265°, said second component ink composition has an angle in the CIELAB standard chromaticity diagram of from about 330° up to about 360°, said third component ink composition has an angle in the CIELAB standard chromaticity diagram of from about 85° up to about 115°, a first secondary color formed from said first and second component ink compositions has an angle in the CIELAB standard chromaticity diagram of from about 290° up to about 320°, a second secondary color formed from said first and third component ink compositions has an angle in the CIELAB standard chromaticity diagram of from about 150° up to about 180°, and a third secondary color formed from said second and third component ink compositions has an angle in the CIELAB standard chromaticity diagram of from about 15° up to about 45°, all of said CIELAB standard chromaticity diagrams being measured with reference to an illuminant C, 2° standard observer.

12. The process of claim 11, said set further including a fourth component ink composition comprising a water-soluble black dye, and a liquid diluent system comprising from about 30 to 100 weight % of an aqueous solvent, and from about 0 to 70 weight % of a water-soluble organic solvent, based on the total weight of said diluent system.

13. The process of claim 11, wherein said CIELAB angles comprise from about 245° up to about 255° for said first component ink composition, from about 335° up to about 355° for said second component ink composition, from about 90° up to about 110° for said third component ink composition, from about 295° up to about 315° for said first secondary color, from about 155° up to about 175° for said second secondary color, from about 20° up to about 40° for said third secondary color.

14. The process of claim 11, wherein said CIELAB angles of said respective first, second and third component ink compositions and said first, second and third secondary colors, are substantially evenly spaced one from the other in the CIELAB standard chromaticity diagram.

15. The process of claim 11, wherein the wavelength of maximum absorbance of said respective component ink compositions comprise from about 660 nm up to about 670 nm for said first component ink composition, from about 554 nm up to about 564 nm for said second component ink composition, and from about 397 nm up to about 407 nm for said third component ink composition.

16. The process of claim 11, wherein the spectral strength in ml/absorbance unit at the maximum point of absorbance (measured in nm) of said respective component ink compositions comprise from about $1.3 \times 10^{-4}$ to about $2.1 \times 10^{-4}$ for said first component ink composition, from about $6.6 \times 10^{-4}$ to about $11.1 \times 10^{-4}$ for said second component ink composition, from about $8.3 \times 10^{-4}$ to about $13.8 \times 10^{-4}$ for said third component ink composition, and from about $4.3 \times 10^{-4}$ to about $7.3 \times 10^{-4}$ for said fourth component ink composition.

17. The process of claim 11, wherein said magenta dye comprises a plurality of individual magenta dye compounds.

18. A process for producing an ink composition for use in an on-demand ink jet color printer associated with a video color display device:
   forming a first component ink composition comprising Direct Blue 86 dye, and a liquid diluent system comprising from about 30 weight % up to about 100 weight % of water, and from about 0 weight % up to about 70 weight % of triethanolamine, said weight % being based on the total weight of said diluent system;
   forming a second component ink composition comprising Acid Red 52 dye and Reactive Red 40 dye, and a liquid diluent system comprising from about 30 weight % up to about 100 weight % of water, and from about 0 weight % up to about 70 weight % of a triethanolamine, said weight % being based on the total weight of said diluent system;
   forming a third component ink composition comprising Direct Yellow 107 dye, and a liquid diluent system comprising from about 30 weight % up to about 100 weight % of water, from about 0 weight % up to about 70 weight % of a triethanolamine, said weight % being based on the total weight of said diluent system;
   forming a fourth component ink composition comprising black dye, and a liquid diluent system comprising from about 30 weight % up to about 100 weight % of water, and from about 0 weight % up to about 70 weight % of a triethanolamine, being based on the total weight of said diluent system;
   said respective first, second, third and fourth component ink compositions being selected so that when they are combined in substantially equal proportions, a color gamut is produced in which said first component ink composition has an angle in a CIELAB standard chromaticity diagram of from about 235° up to about 265°, said second component ink composition has an angle in the CIELAB standard chromaticity diagram of from about 330° up to about 360°, said third component ink composition has an angle in the CIELAB standard chromaticity diagram of from about 85° up to about 115°, a first secondary color formed from said first and second component ink compositions has an angle in the CIELAB standard chromaticity diagram of from about 290° up to about 320°, a second secondary color formed from said first and third component ink compositions has an angle in the CIELAB standard chromaticity diagram of from about 150° up to about 180°, and a third secondary color formed from said second and third component ink compositions has an angle in the CIELAB standard chromaticity diagram of from about 15° up to about 45°, all of said CIELAB standard chromaticity diagrams being measured with respect to an illuminant C, 2° standard observer,
   combining said respective first, second, third, and fourth component ink compositions to form a composite ink composition having a CIELAB standard chromaticity diagram substantially similar to the CIELAB standard chromaticity diagram of said color video display.

19. The process of claim 18, wherein said liquid diluent system further includes from about 0 weight % up to about 0.5 weight % of chelating agent and from about 0 weight % up to about 1.0 weight % of a biocide.

20. The process of claim 18, wherein the wavelength of maximum absorbance of said respective component ink compositions comprise from about 660 nm up to about 670 nm for said first component ink composition, from about 554 nm up to about 564 nm for said second component ink composition, from about 397 nm up to about 407 nm for said third component ink composition.

* * * * *